UNITED STATES PATENT OFFICE.

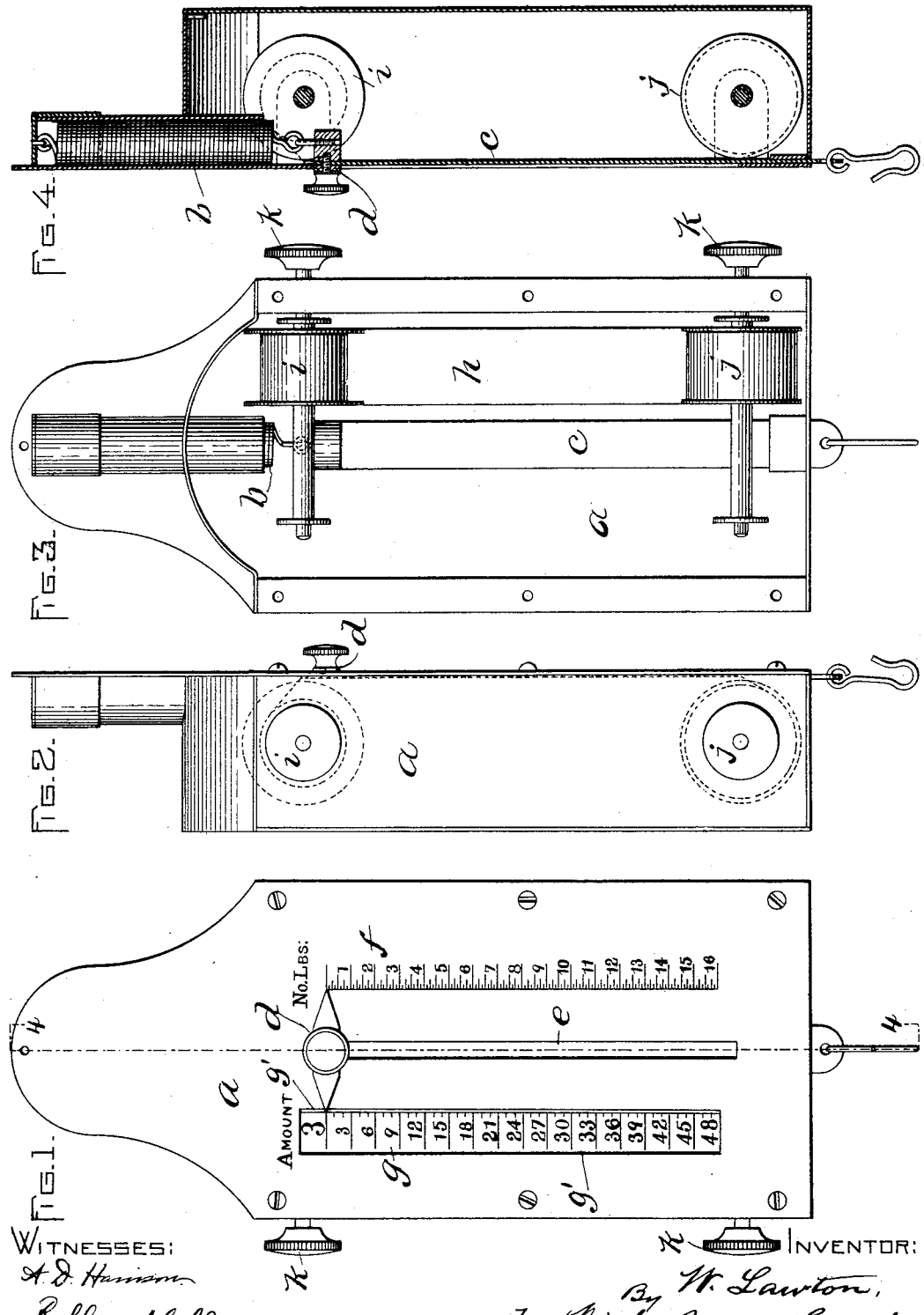

WILLIAM LAWTON, OF SOUTH WEST HARBOR, MAINE.

COMPUTING-SCALE.

SPECIFICATION forming part of Letters Patent No. 538,114, dated April 23, 1895.

Application filed May 18, 1894. Serial No. 511,708. (No model.)

*To all whom it may concern:*

Be it known that I, WILLIAM LAWTON, of South West Harbor, in the county of Hancock and State of Maine, have invented certain new and useful Improvements in Computing-Scales, of which the following is a specification.

This invention has relation to that kind of weighing scales in which in addition to indicating the weight of an article in the scales, also indicates the cost of the same.

It is the purpose of the invention to provide such improvements in computing scales or spring balances as will render them exceedingly simple in, and economical of, construction, and make them also efficient in the highest degree in the way of indicating the cost as well as the weight of the substance in the scale.

In evolving this invention, I have aimed to produce a perfectly practical device, from the standpoint of the users; and therefore a feature of the invention is the quickness and accuracy with which the device can be adjusted to any price-scale desired, by reason of the different price-scales being clearly divided from each other and such division being made by prominent numerals, multiplicands of the different scales but distinct from the lowest numerals of the scales, which of course are of the same denominations. Provision is made in the casing for having these prominent numerals stand as headings of the scales beyond the index-finger.

To these ends the invention consists in the novel arrangements of parts recited in the appended claims.

Reference is to be had to the annexed drawings and to the letters marked thereon, forming a part of this specification, the same letters indicating the same parts or features, as the case may be, wherever they occur.

Of the drawings—Figure 1 is a front view of my improved computing scale or spring balance. Fig. 2 is a side view thereof. Fig. 3 is a rear view, the rear plate or back of the casing being removed the better to exhibit the construction of the interior of the scale. Fig. 4 is a vertical sectional view taken on the line 4—4 of Fig. 1.

In the drawings—*a* designates the casing of a spring balance which may be of the form shown or of any other suitable or convenient form. *b* designates the balance spring which may likewise be of any desired or suitable construction, to which spring is connected the scale-bar, *c*, the lower end of which may be provided with a hook or with a plate or other suitable receiver for the reception of the substance to be weighed.

Connected with the scale-bar, *c*, is a pointer or hand, *d*, which is attached to a stud extending through a slot, *e*, formed in the front plate or part of the casing, *a*. The said pointer, *d*, is constructed to point in opposite directions from the slot, *e*, pointing at one side, as at, *f*, to a scale graduated to the number of pounds which the scale is adapted to weigh, all as is usual in this form of spring balance. On the other side the pointer, *d*, points to a scale, *g*, graduated to indicate the price in pounds of the substance being weighed by the scale. As shown in the present instance, the scale, *g*, is printed on a strip of parchment or fabric, *h*, wound at its upper end upon a spool, *i*, and at its lower end upon a spool, *j*. The shafts of the said spools are journaled in suitable bearings connected with the casing, and at one end said shafts extend through a side of the casing, *a*, and are provided on their outer ends with thumb pieces, *k*, so that by turning the said thumb pieces the spools, *i* or, *j*, may turn to wind the paper or fabric, *h*, thereon, and unwind it from the other spool, thus shifting this strip *h*. The latter is inscribed throughout its length, which is considerable, with a number of scales similar to this scale *g* but having different multiplicands, so that by shifting the strip that scale suited to the price per pound of the matter being weighed can be brought to view.

In use, supposing the price of the article being weighed to be three cents per pound the scale, *g*, which is graduated accordingly, is brought to view, as indicated in Fig. 1, so that if the article or substance being weighed should weigh, say three pounds, the pointer or indicator would point one side to 3 and on the opposite side to 9 on the shiftable scale. If the price per pound of the substance in the scale should be more or less than three cents per pound by taking hold of one of the thumb pieces, k, the strip, h, may be shifted so as to bring a scale of suitable gradation into position as before described.

The strip h is arranged inside the casing and the latter is formed with a slot g' extending parallel with the slot e and of proper dimensions to accommodate one of the scales of said strip at a time.

By this means it will be seen that a very simple and inexpensive and at the same time entirely serviceable computing scale is formed, and one which may be readily manipulated to suit requirements.

The different scales inscribed on the strip h are divided from each other by large numbers, of which the numerals of the different scales are multiples; that is to say, the scale made of multiples of three is headed by the figure 3 in much larger type than the scale numerals, as clearly shown in Fig. 1. To have this numeral show clearly above the index-finger d with the latter in its highest position, the slot g' is extended upward sufficiently beyond the slot e to accommodate the large numeral. Thus to adjust the strip for a certain price-scale, the large numeral of which the numerals of that scale are multiples is brought to the upper end of the slot g'. It will of course be understood that this large numeral is distinct from the scale-numeral of the same denomination.

A marked advantage of my device is its great capacity for different price-scales without materially increasing the size of the casing. It is evident that the spools can carry a strip of great length.

Having thus explained the nature of the invention and described a way of constructing and using the same, though without attempting to set forth all of the forms in which it may be made or all of the modes of its use, it is declared that what is claimed is—

1. In a computing spring balance, the combination of a casing having a central longitudinal slot in its face, a weight scale extending along one side of said slot and a parallel slot at the other side; reels journaled in bearings within the casing at the ends of said side-slot with their spindles protruding through one side of the casing and bearing knobs on their ends; a narrow strip carried by the reels with its stretch showing through the side-slot, the said strip bearing a single longitudinal row of numbers comprising a plurality of price-scales, any one of which can be brought to view through the slot by turning the knobs; a spring; and a slide connected therewith and working in the central slot of the casing, and having a double-ended pointer extending over the face of the casing, substantially as and for the purpose described.

2. In a computing spring-balance, the combination with a casing having a central longitudinal slot in its face, a weight-scale inscribed along one side of said slot, and a parallel slot at the opposite side of the latter and extended beyond it at the upper end; of an elongated narrow strip arranged for disclosure in sections through said slot and inscribed with a number of different scales in the different sections and all in a single longitudinal line and separated from each other by more prominent numerals than those composing the scales, said prominent numerals being multiplicands of the scales respectively and accommodated in the extension of the slot; suitable supports for the strip; and means for shifting the same, substantially as described.

In testimony whereof I have signed my name to this specification, in the presence of two subscribing witnesses, this 12th day of May, A. D. 1894.

WILLIAM LAWTON.

Witnesses:
JAMES S. FERNALD,
E. WEBSTER FRENCH.